(12) United States Patent
Binshtock et al.

(10) Patent No.: US 8,489,773 B1
(45) Date of Patent: Jul. 16, 2013

(54) SYSTEM, METHOD, AND COMPUTER PROGRAM FOR SENDING A RESPONSE TO A CLIENT BASED ON A REPLICATION MESSAGE RECEIVED FROM A MASTER SERVER

(75) Inventors: Michael Binshtock, Tel Aviv (IL); Ilana Ben-Dori, Macabim (IL)

(73) Assignee: Amdocs Software Systems Limited, Dublin 3 (IE)

( * ) Notice: Subject to any disclaimer, the term of this patent is extended or adjusted under 35 U.S.C. 154(b) by 229 days.

(21) Appl. No.: 12/134,979

(22) Filed: Jun. 6, 2008

(51) Int. Cl.
*G06F 15/16* (2006.01)

(52) U.S. Cl.
USPC .......... 709/248; 709/203; 709/208; 709/219; 709/232; 707/609

(58) Field of Classification Search
USPC ............... 709/220, 248, 203, 208–211, 219, 709/232; 707/609–619, 633–635
See application file for complete search history.

(56) References Cited

U.S. PATENT DOCUMENTS

| | | | | |
|---|---|---|---|---|
| 6,505,200 | B1 | 1/2003 | Ims et al. | 707/8 |
| 7,158,998 | B2 | 1/2007 | Bhuyan | 707/201 |
| 7,496,579 | B2 * | 2/2009 | Garbow et al. | 1/1 |
| 2004/0034807 | A1 * | 2/2004 | Rostowfske | 714/4 |
| 2007/0136389 | A1 * | 6/2007 | Bergant et al. | 707/201 |
| 2007/0180302 | A1 * | 8/2007 | Allen et al. | 714/6 |

OTHER PUBLICATIONS

Everett, "Software versus hardware replication for disaster recovery," InfoStor, Jun. 2002, http://www.infostor.com/Articles/Article_Display.cfm?Section=Articles&Subsection=Display&ARTICLE ID=146708.

* cited by examiner

*Primary Examiner* — Phuoc Nguyen
*Assistant Examiner* — Clarence John
(74) *Attorney, Agent, or Firm* — Zilka-Kotab, PC (57) ABSTRACT

A system, method, and computer program are provided for sending a response to a client based on a replication message received from a master server. In use, a replication message is received at a replication server from a master server. Further, a response is sent from the replication server to a client based on the replication message received from the master server.

20 Claims, 6 Drawing Sheets

SYSTEM, METHOD, AND COMPUTER PROGRAM FOR SENDING A RESPONSE TO A CLIENT BASED ON A REPLICATION MESSAGE RECEIVED FROM A MASTER SERVER

FIELD OF THE INVENTION

The present invention relates to replication of data, and more particularly to replicating data from a master server to a replication server.

BACKGROUND

Traditionally, data replication includes replicating data from a first server to a second server. The data replication allows the second server to function as a backup of the first server in the event of a failure of the first server.

One technique conventionally utilized for replicating data from the first server to the second server is synchronous replication. As an example, the first server utilizing the synchronous replication replicates the data associated with a transaction received from a client to the second server. Further, the first server then receives a result back from the second server prior to returning the result to the client. As a result of the synchronous replication, each transaction is slowed since the data associated with the transaction must first be replicated to the second server and a result of the replication must then be returned to the first server prior to sending the result back to the client.

Another technique conventionally utilized for replicating data from the first server to the second server is asynchronous replication. For example, the first server utilizing the asynchronous replication replicates the data associated with a transaction received from a client to the second server in batches after the result of the transaction is returned to the client. However, as a result of the asynchronous replication, the second server may not include an up to date copy of the first server in the event of a sudden failure of the first server prior to a replication batch.

There is thus a need for addressing these and/or other issues associated with the prior art.

SUMMARY

A system, method, and computer program are provided for sending a response to a client based on a replication message received from a master server. In use, a replication message is received at a replication server from a master server. Further, a response is sent from the replication server to a client based on the replication message received from the master server.

DETAILED DESCRIPTION

Figure 1:
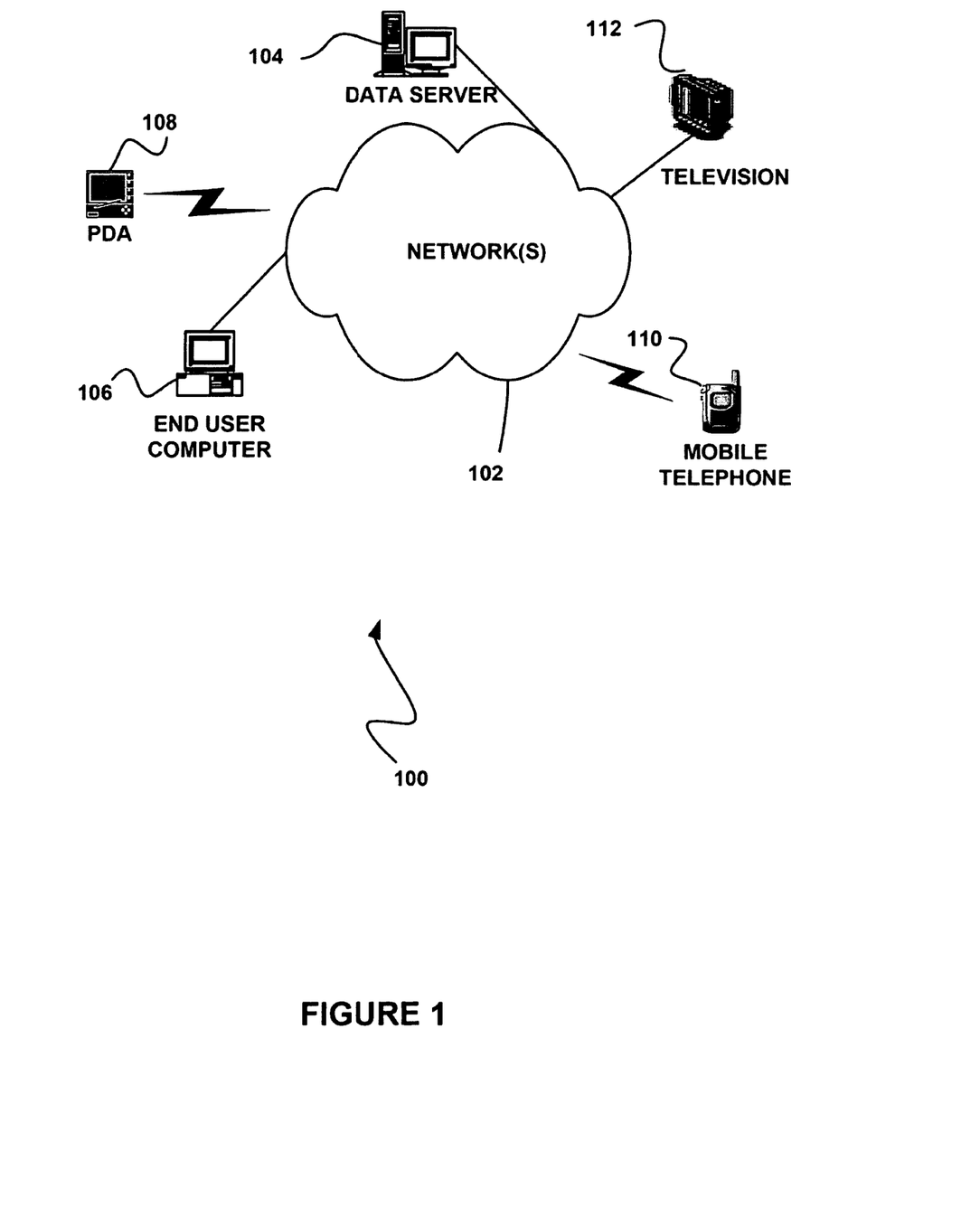
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
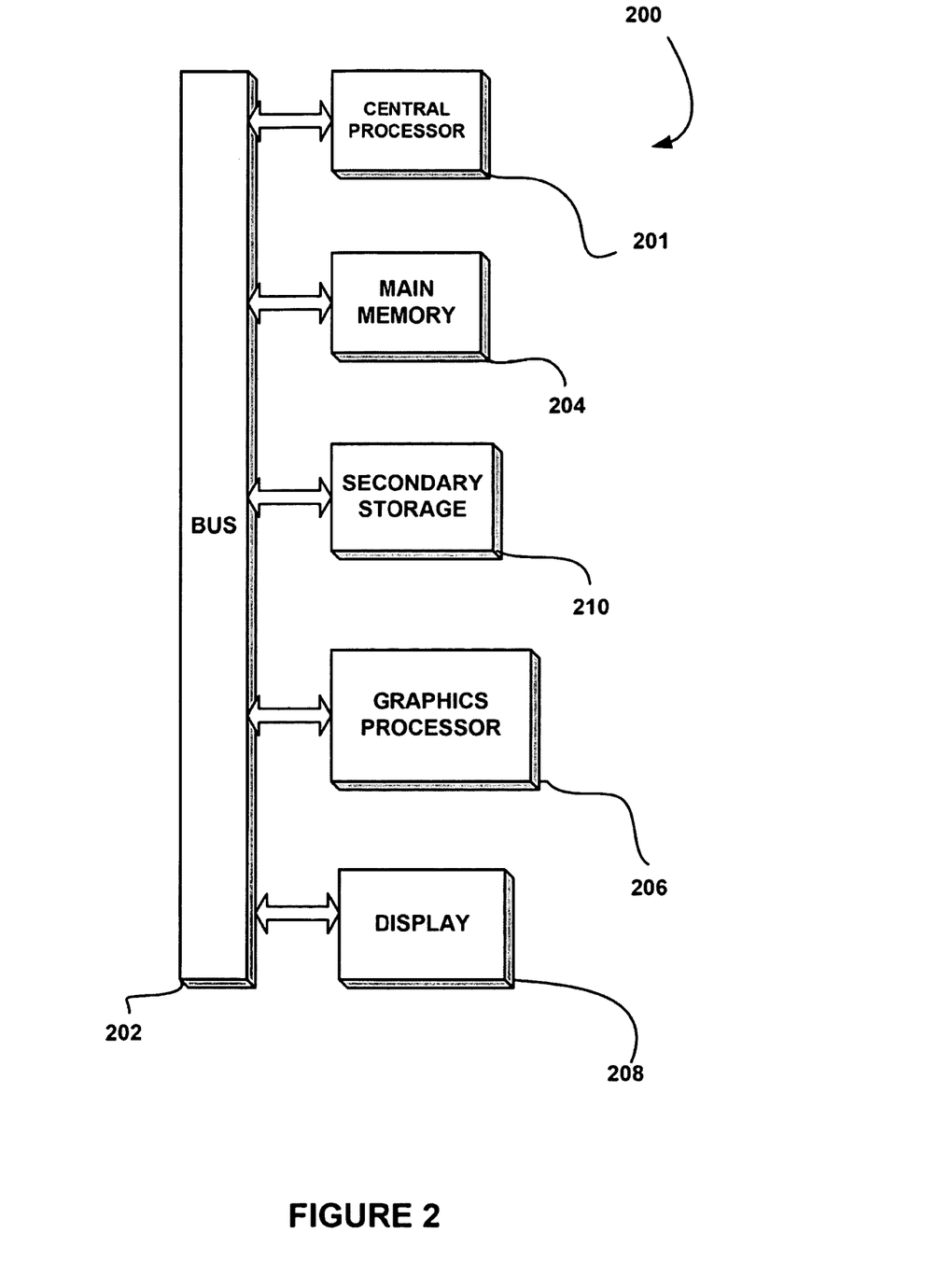
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a non-transitory computer readable medium such as a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
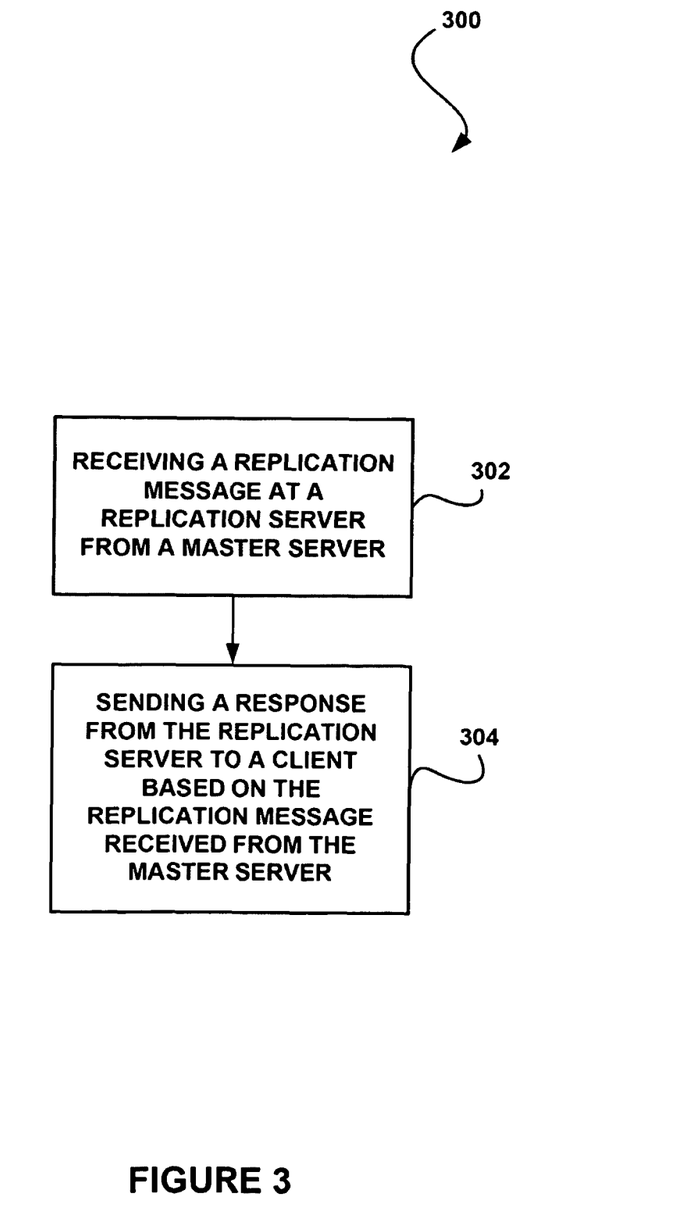
FIG. 3 illustrates a method for sending a response to a client based on a replication message received from a master server, in accordance with another embodiment.

FIG. 3 illustrates a method 300 for sending a response to a client based on a replication message received from a master server, in accordance with another embodiment. As an option, the method 300 may be carried out in the context of the details of FIG. 1 and/or 2. Of course, however, the method 300 may be carried out in any desired environment. Further, the aforementioned definitions may equally apply to the description below.

As shown in operation 302, a replication message is received at a replication server from a master server. In the context of the present description, the replication message may include any message capable of being sent to the replication server. Optionally, the replication server may utilize the replication message to update data stored on the replication server.

As yet another option, the replication server may include any server capable of receiving the replication message. For example, the replication server may include a first server. Further, the master server may include any server capable of sending the replication message to the replication server. As an example, the master server may include a second server. Optionally, the replication server and/or the master server may each include a database server, a storage server, a caching server, a web server, an email server, etc. As another option, the replication server may receive the replication message from the master server via a network. For example, the replication server may update a database based on the receipt of the replication message.

In one embodiment, the replication message may include an update instruction. Optionally, the update instruction may include any instruction capable of instructing the replication server to perform an update. For example, the update instruction may instruct the database of the replication server to perform an update. As an option, the update instruction may include an insert instruction, a modify instruction, a delete instruction, a create instruction, a drop instruction, a merge instruction, etc. Additionally, as yet another option, the database of the replication server may include a hierarchical model database, a network model database, a relational model database, a post-relational model database, an object model database, a datastore, etc.

In another embodiment, the replication message may include data associated with the update instruction. Optionally, the data may include any data capable of being associated with the replication message. As an option, the update instruction may instruct the replication server to perform an update utilizing the data associated with the update instruction. For example, the update instruction may instruct the replication server to update an application, a database, a datastore, etc. utilizing the data associated with the update instruction.

As still yet another option, the replication message may include any additional information associated with the replication message from the master server to the replication server. Optionally, the replication message may be associated with a request. Additionally, as an option, the request may include any request received by the master server. As another option, the request may include any instruction, command, or data capable of received by the master server. For example, the master server may receive the request, may perform the update instructed by the request, and may generate the replication message after performing the update.

In yet another embodiment, the replication message may include a database query. Optionally, the replication message may include multiple database queries. For example, the database query may be formatted in a standard query language (SQL) format, in a proprietary format, or any other query format. Further, as another option, the database query may include a database name, a database schema, a database table, a database field, and/or a database field value, etc.

Additionally, in still yet another embodiment, the replication message may synchronize a database on the replication server with a database on the master server. As an option, synchronizing the databases may include updating the database of the replication server to match the database of the master server. Further, as yet another option, synchronizing the databases may include updating the state and/or data of the database on the replication server to match the state and/or data of the database on the master server. For example, the replication message may allow for the replication of the data and/or state of the database on the master server to the database on the replication server. As yet another example, the database on the replication server may be associated with the replication server, and/or the database on the master server may be associated with the master server.

Furthermore, in one embodiment, the master server may initiate the replication message in response to the request received from the client. As an example, the master server may receive the request from the client, and the replication server may receive the replication message from the master server. Thus, the master server may send the replication message to the replication server in response to receipt by the master server of the request from the client. Optionally, receiving the replication message at the replication server may include accepting, collecting, catching, getting, etc. the replication message at the replication server. Further, as yet another option, receiving the replication message may include the replication server pulling the replication message from the master server. As another option, receiving the replication message may include the master server pushing the replication message to the replication server.

Further, as shown in operation 304, a response is sent from the replication server to a client based on the replication message from the master server. In the context of the present description, the response may include an answer, a reaction, a reply, a result, etc. that is based on the replication message received from the master server. Optionally, the response may include a message, an alert, and/or any data capable of including the response.

In one embodiment, the response may include an indication of whether a performance of the replication message was successful at the replication server. Just by way of example, the response may indicate whether the replication server was successfully updated utilizing the replication message. In another embodiment, the response may include an indication of whether a performance of the request was successful at the master server.

Thus, in another embodiment, the replication message from the master server may optionally be received with another response from the master server. For example, the other response from the master server may be inserted in, attached to, etc. the replication message by the master server, and transmitted with the replication message to the replication server. Optionally, the master server may send the other response to the replication server based on the request (e.g. based on performing the request at the master server, etc.).

In yet another embodiment, the other response may include a result of performing the request at the master server. As an option, the result of performing the request from the master server may indicate a success or a failure of the performance of the request at the master server (e.g. whether the request was successfully performed at the master server, etc.). For example, the result of performing the request at the master server may indicate a failure if the performance of the request failed at the master server. Further, as yet another example, the result of performing the request at the master server may indicate a success if the performance of the request was successful at the master server.

Further, in still yet another embodiment, the other response may include a message associated with the request. For example, if the result of the performance of the request at the master server indicates the failure of the request, then the other response may include a message associated with the request. Optionally, the message may include an error message, an informational message, an alert message, etc.

Thus, in one embodiment, the replication server may determine if the request was successful at the master server. As an option, the replication server may determine if the request was successful at the master server based on the replication message received from the master server. For example, as described above, the replication may be received with the other response from the master server. Further, as yet another option, if the determination indicates that the request was successful, then the replication server may perform an update associated with the replication message. For example, if the determination indicates that the request was successful at the master server, then the replication server may update a database of such replication server based on the replication message.

In another embodiment, the replication server may send the response to the client after the determination. For example, after determining that the replication was successful, the replication server may send the response to the client indicating that the request was successful. As yet another example, after determining that the request failed, the replication server may send the response to the client indicating that the request failed.

To this end, the replication server may receive the other response from the master server indicating a result of performing the request at the master server, such that the replication server may send (e.g. forward, etc.) the other response to the client. As another option, the response sent from the replication server to the client may include the other response received from the master server along with an indication of whether performance of the update based on the replication message at the replication server was successful. Accordingly, the client may be informed of a result of performance of the request for the master server and/or the performance of the update based on the replication message for the replication server.

To this end, the master server may optionally be released after the replication message is sent to the replication server. As another option, the master server may be released after the replication server receives the replication message and sends the response to the client. For example, the client sending the request to the master server, and receiving the response from the replication server may allow the master server to receive other requests and may maintain synchronicity between the database of the master server and the database of the replication server, thereby avoiding having the master server wait for the response from the replication server before receiving an additional request.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
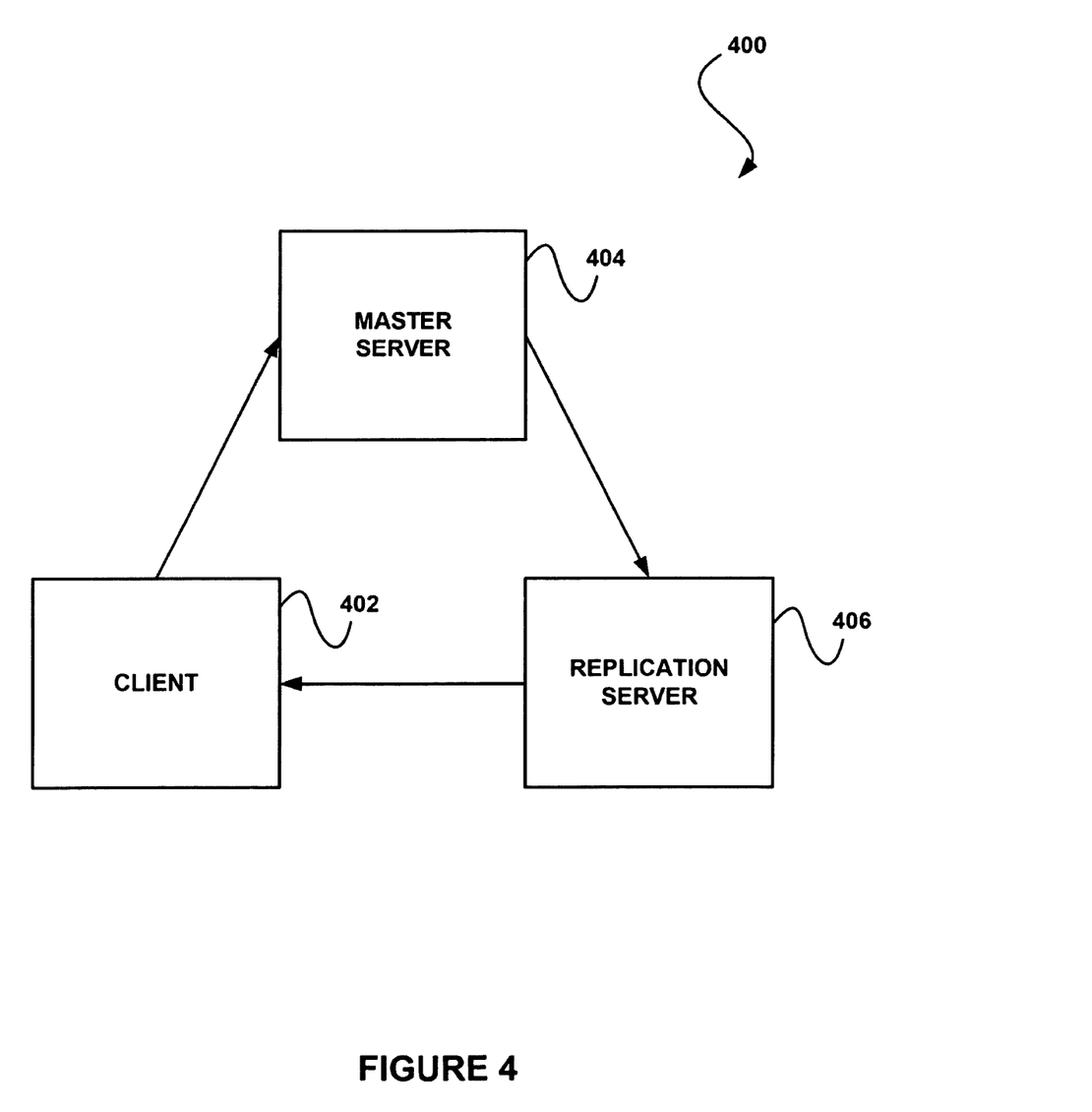
FIG. 4 illustrates a system for sending a response to a client based on a replication message received from a master server, in accordance with yet another embodiment.

FIG. 4 illustrates a system 400 for sending a response to a client based on a replication message received from a master server, in accordance with yet another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

The system 400 includes a client 402, a replication server 406, and a master server 404, as shown. With respect to the present embodiment, the client 402 may include any device capable of sending a request. Optionally, the client 402 may include a database client, an email client, a web client, an event source, etc. Of course, however, the client 402 may include any of the devices described above with respect to FIG. 1 and/or 2.

Also with respect to the present embodiment, the master server 404 may include any server capable of sending a replication message to the replication server 406. For example, the master server 404 may receive the request from the client 402 and may send the replication message to the replication server 406. As another option, the master server 404 may include a database server, an email server, a web server, an event processor, a replication server, etc.

Still yet, with respect to the present embodiment, the replication server 406 may include any server capable of receiving the replication message from the master server 404 and sending a response to the client 402 based on the replication message received from the master server 404. As an option, the replication server 406 may include a database server, an email server, a web server, an event processor, a master server, etc.

In one embodiment, the client 402 may send the master server 404 the request (e.g. over a network, etc.). Further, as an option, the request may include any request for the master server 404 to perform an update. For example, the client 402 may include a database client that generates the request requesting the master server 404 to update a database located on the master server 404.

In another embodiment, the master server 404 may receive the request from the client 402. Optionally, the master server 404 may perform an update based on the request. For example, the master server 404 may update the database located on the master server 404 based on the request. As an option, a result of the update may be generated which indicates a success or a failure of the update at the master server 404.

In still yet another embodiment, the master server 404 may send the replication message to the replication server 406. As an option the master server 404 may include the result of the request at the master server 404 with the replication message, and therefore may send the result and the replication message to the replication server 406. Optionally, the result of the request may be inserted into the replication message.

Further, in one embodiment, the replication server 406 may receive the replication message from the master server 404. As an option, the replication server 406 may perform an update based on the replication message. Optionally, the replication server 406 may include a database. For example, the replication server 406 may update the database located thereon based on the replication message. Optionally, the replication message may synchronize the database located on the replication server 406 with the database located on the master server 404.

Additionally, in another embodiment, the replication server 406 may determine if the database located thereon should be updated based on replication message received from the master server 404. As an option, if the replication message indicates that the update was successful at the master server 404, then the replication server 406 may perform the update based on the replication message. Optionally, if the replication message indicates that the update was unsuccessful at the master server 404, then the replication server 406 may skip the update requested by the replication message.

In addition, in yet another embodiment, the replication server 406 may send a response to the client 402. As an option, the response may indicate the result of the performance of the replication message. Optionally, the result of the replication message may include the result of the performance of the request at the master server 404, the result of the performance of the update at the replication server 406, and/or the combined result of the performance of the update at the replication server 406 and the master server 404.

Furthermore, in still yet another embodiment, the client 404 may receive the response from the replication server 406. Optionally, the response may indicate the request that prompted the response. For example, the client 402 may send the request to the master server 404, which may further send the replication message to the replication server 406, which may even further send the response to the request and/or replication message to the client 402.

As an option, the replication server 406, the master server 404, and/or the client 402 may each be in communication via at least one network. As another option, the replication server 406, the master server 404, and/or the client 402 may be connected asynchronously. For example, connecting the replication server 406, the master server 404, and the client 402 asynchronously may allow the client 402 to send the request to the master server 404 and receive the response from the replication server 406.

Figure 5:
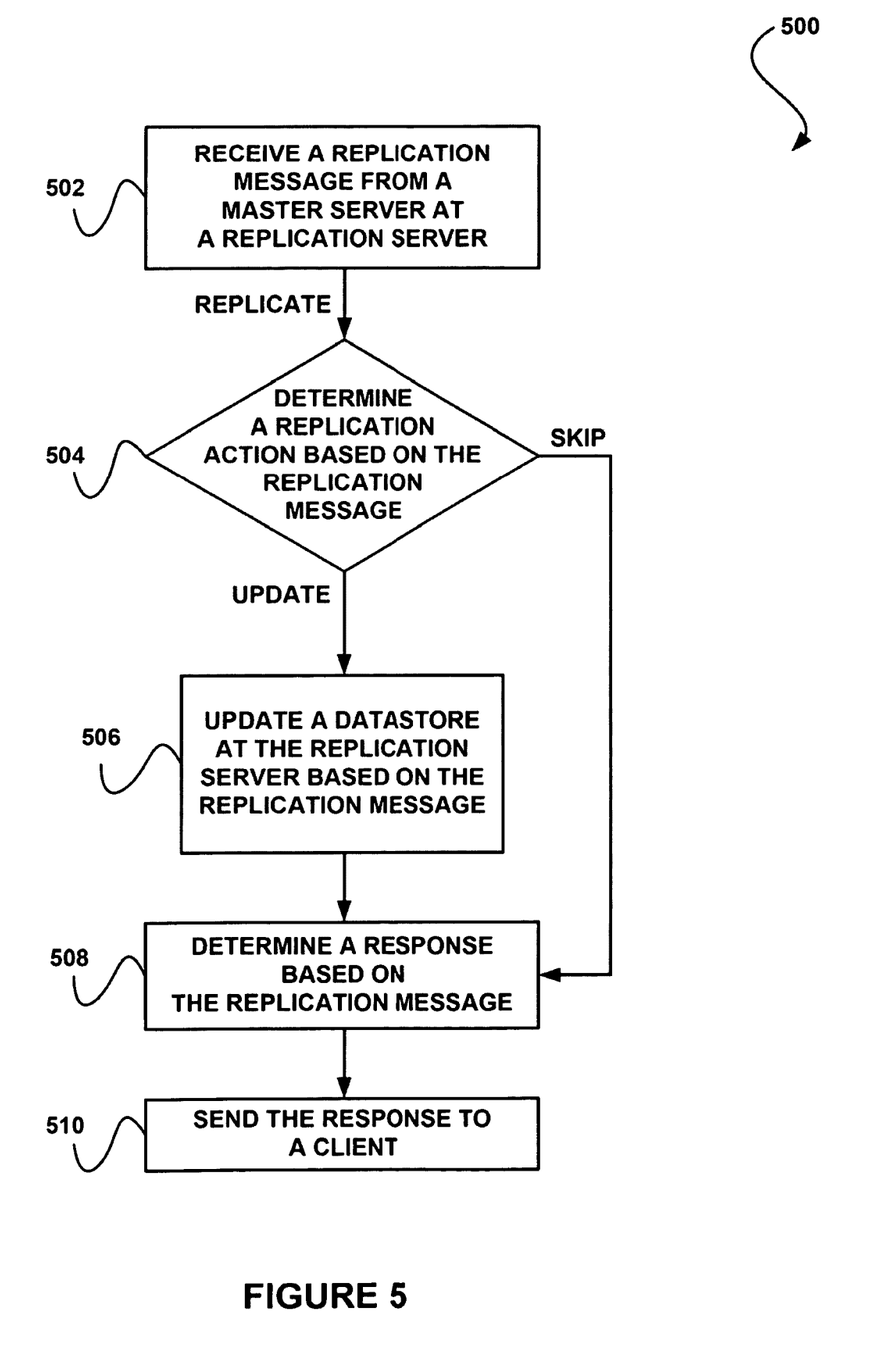
FIG. 5 illustrates a method for sending a response to a client based on a result of a request, in accordance with still yet another embodiment.

FIG. 5 illustrates a method 500 for method for sending a response to a client based on a result of a request, in accordance with still yet another embodiment. As an option, the method 500 may be carried out in the context of the details of FIGS. 1-4. For example, the method 500 may be carried out utilizing a replication server 406 of FIG. 4. Of course, however, the method 500 may be carried out in any desired environment. Further, the aforementioned definitions may equally apply to the description below.

As shown in operation 502, a replication message is received from a master server at a replication server. Further, as an option, the master server may have generated the replication message in response to receiving a request. Optionally, the master server may have received the request from a client. As yet another option, the master server may have received the request from another server, etc.

Further, in one embodiment, the master server may process the request before sending the replication message to the replication server. Optionally, processing the request may include parsing the request. As still yet another option, processing the request may include performing an update based on the request. As an example, performing the update may include updating a database of the master server based upon the request. As an option, a result of the performance of the update at the master server may be indicated as a success or a failure.

In another embodiment, the replication message may include the result of the performance of the request at the master server. Further, as an option, the replication message may include a request to replicate. Furthermore, as still yet another option, the result of the performance of the request at the master server may be sent to the replication server separate from the replication message. For example, if the update based on the request at the master server was successful, then the result of the performance of the request at the master server may indicate that the update was successful. As yet another example, if the update based on the request at the master server was unsuccessful, then the result of the performance of the request at the master server may indicate that the update was unsuccessful.

Further, as shown in decision 504, a replication action is determined based on the replication message. As an example, the replication action may include a skip action, an update action, etc. As an option, the replication server may process the replication message to determine the result of the performance of the request at the master server. For example, the replication server may utilize the replication message to determine whether the result of the performance of the request at the master server was a success or a failure. Optionally, the replication server may perform an action based upon the result of the performance of the request at the master server, as described below.

In addition, if the replication action is determined to indicate an update, then a datastore at the replication server is updated based on the replication message, as shown in operation 506. Optionally, updating the database at the replication server may synchronize the database of the replication server with the database of the master server. For example, if the database of the master server was successfully updated based on the request, then updating the database of the replication server based on the replication message may synchronize such database with the database of the master server. Further, as yet another option, the result of the performance of the update based on the replication message at the replication server may be indicated as a success or a failure.

Additionally, if the replication action is determined to indicate a skip, then the replication server may skip updating the database at the replication server based on the replication message. For example, by not updating the database of the replication server when the database of the master server is not successfully updated based on the request, the database of the replication server may be kept in sync with the database of the master server. Also, as yet another option, if the database of the replication server is not updated based on the replication message, then a result of the performance of update based on the replication message at the replication server may be indicated as a failure.

Furthermore, a response is determined based on the replication message. See operation 508. Optionally, if the result of the performance of the request at the master server and the result of the performance of the update based on the replication message at the replication server both indicate a success, then the response may be indicated as a success. As yet another option, if the result of the performance of the request at the master server and the result of the performance of the update based on the replication message at the replication server both indicate a failure, then the response may be indicated as a failure.

In addition, as still yet another option, if the result of the performance of the update based on the replication message at the replication server and the result of the performance of the request at the master server do not both indicate success or do not both indicate a failure, then the response may be indicated as a partial failure. For example, if the result of the performance of the request at the master server indicates a success and the result of the performance of the update based on the replication message at the replication server indicates a failure, then the response may be indicated as a partial failure. Optionally, the partial failure may include a replication failure.

Additionally, as shown in operation 510, the response is sent to a client. Optionally, the client may perform an additional action based on the response. As an option, the client may perform error handling, and/or additional actions based on the response from the replication server.

Figure 6:
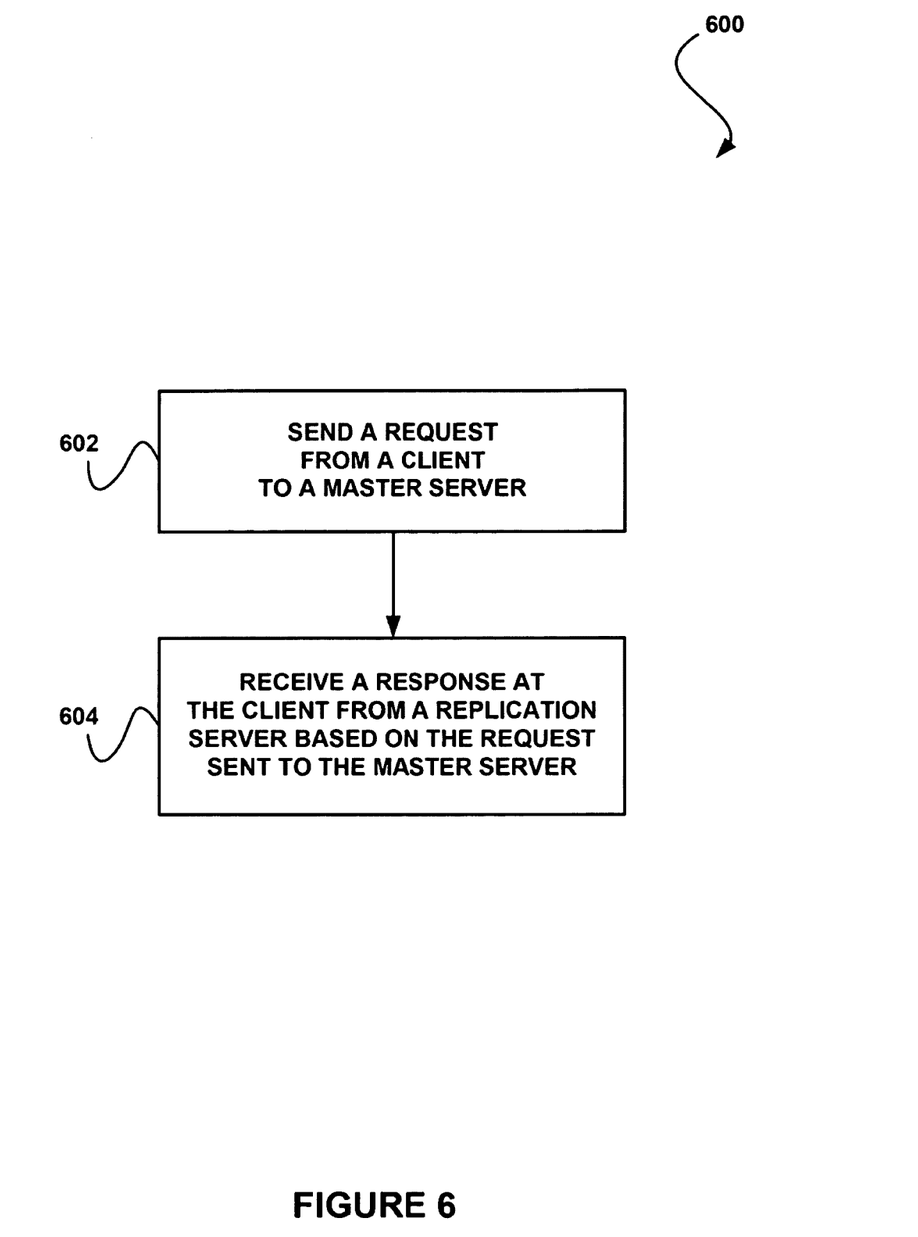
FIG. 6 illustrates a method for sending an update event to a master server and receiving a response from a replication server, in accordance with one embodiment.

FIG. 6 illustrates a method 600 for sending an update event to a master server and receiving a response from a replication server, in accordance with one embodiment. As an option, the method 600 may be carried out in the context of the details of FIGS. 1-5. For example, the method 600 may be carried out utilizing the client 402 of FIG. 4. Of course, however, the method 600 may be carried out in any desired environment. Further, the aforementioned definitions may equally apply to the description below.

As shown in operation 602, a request is sent from a client to a master server. Optionally, the request sent from the client to the master server may request an update of a database of the master server. Further, as an option, after receiving the request from the client, the master server may update the database. In addition, as yet another option, after updating the database, the master server may send a replication message to a replication server for replication. As an option, the replication message may include a result of updating the database at the master server.

In yet another embodiment, after receiving the replication message from the master server, the replication server may update a database of the replication server based on the replication message. In addition, as yet another option, after updating the database, the replication server may determine a response of the replication message. Optionally, if the performance of the request at the master server was successful and if the update of the database of the replication server based on the replication message was successful, then the response may indicate a success. As yet another option, if the performance of the request at the master server was not successful and if the update of the database of the replication server based on the replication message was not successful, then the response may indicate a failure. Furthermore, as another option, if the performance of the request at the master server was successful and if the update of the database of the replication server based on the replication message was not successful, then the response may indicate a replication failure.

In addition, in still yet another embodiment, the replication server may send the response to the client. Further, as shown in operation 604, the response is received at the client from the replication server based on the request sent to the master server. As an option, the response may indicate a success or failure of the request and/or the replication, as noted above. Optionally, the client may perform an additional action and/or error handling based on the received response.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving a replication message at a replication server from a master server, wherein the replication message received at the replication server from the master server is initiated based on a request by a client that the master server perform an update to a database of the master server, and the replication message is received by the replication server with another response from the master server including a result of the master server performing the update to the database of the master server, the result indicating a success or a failure of the performance of the update;
   computer code for determining, at the replication server in response to the receipt of the replication message from the master server, the result of the performance of the update to the database of the master server by the master server, the result indicating the success or the failure of the performance of the update;
   computer code for, when it is determined that the result of the performance of the update to the database of the master server by the master server indicates the success of the performance of the update to the database of the master server by the master server, performing, at the replication server, an update associated with the replication message;
   computer code for, when it is determined that the result of the performance of the update to the database of the master server by the master server indicates the failure of the performance of the update to the database of the master server by the master server, skipping, at the replication server, the update associated with the replication message;
   computer code for determining, at the replication server, a response based on the replication message received from the master server, the response indicating the result of the performance of the update to the database of the master server and a result of a performance of the update at the replication server; and
   computer code for sending, from the replication server to the client, the response identifying the request by the client and indicating both the result of the performance of the update to the database of the master server by the master server and the result of the performance of the update by the replication server;
   wherein the replication server, the master server, and the client are connected asynchronously, such that the client sends the request to the master server and receives the response from the replication server;
   wherein the computer program product is operable such that the replication server determines a replication action based on the replication message received from the master server, where the replication action includes at least one of the performing of the update associated with the replication message at the replication server and the skipping of the update associated with the replication message at the replication server.

2. The computer program product of claim 1, wherein the update to the database of the master server includes an insert, a modify, or a delete instruction.

3. The computer program product of claim 1, wherein the replication message includes data associated with the update to the database of the master server.

4. The computer program product of claim 1, wherein the replication server updates a replication database based on the replication message.

5. The computer program of claim 4, wherein the replication server updates the replication database based the replication message in response to the determination that the result of the performance of the update to the database of the master server indicates the success of the performance of the-update to the database of the master server by the master server.

6. The computer program product of claim 1, wherein the replication message synchronizes a replication database of the replication server with the database of the master server.

7. The computer program product of claim 1, wherein the other response is included in the replication message from the master server.

8. The computer program product of claim 1, wherein if the result of the performance of the update to the database of the master server indicates the failure of the performance of the update to the database of the master server, then the other response includes a message associated with the request.

9. The computer program of claim 1, wherein the master server is released after the replication server receives the replication message and sends the response to the client.

10. The computer program of claim 9, wherein the client sending the request to the master server and receiving the response from the replication server allows the master server to receive at least one additional request to perform another update to the database of the master server, and maintains synchronicity between the database of the master server and a database of the replication server, for preventing the master server from waiting for the response from the replication server before receiving the at least one additional request.

11. The computer program of claim 1, wherein the result of the performance of the update to the database of the master server by the master server is determined at the replication server based on the replication message received from the master server.

12. The computer program of claim 1, wherein the other response from the master server is included in the response sent from the replication server to the client and informs the client of the result of the performance of the update to the database of the master server, and the client performs an additional action based on and in response to the other response.

13. The computer program of claim 1, wherein the master server is released after the replication message is sent to the replication server from the master server, such that the master server is then allowed to receive at least one additional request to perform another update to the database of the master server.

14. The computer program of claim 1, wherein if the result of the performance of the update to the database of the master server by the master server and the result of the performance of the update based on the replication message at the replication server both indicate a success, then the response sent from the replication server to the client indicates a success.

15. The computer program of claim 1, wherein if the result of the performance of the update to the database of the master server by the master server and the result of the performance of the update based on the replication message at the replication server both indicate a failure, then the response sent from the replication server to the client indicates a failure.

16. The computer program of claim 1, wherein if the result of the performance of the update to the database of the master server by the master server and the result of the performance of the update based on the replication message at the replication server do not both indicate a success and do not both indicate a failure, then the response sent from the replication server to the client indicates a partial failure.

17. A method, comprising:
receiving a replication message at a replication server from a master server, wherein the replication message received at the replication server from the master server is initiated based on a request by a client that the master server perform an update to a database of the master server, and the replication message is received by the replication server with another response from the master server including a result of the master server performing the update to the database of the master server, the result indicating a success or a failure of the performance of the update;
determining, at the replication server in response to the receipt of the replication message from the master server, the result of the performance of the update to the database of the master server by the master server, the result indicating the success or the failure of the performance of the update;
when it is determined that the result of the performance of the update to the database of the master server by the master server indicates the success of the performance of the update to the database of the master server by the master server, performing, at the replication server, an update associated with the replication message;
when it is determined that the result of the performance of the update to the database of the master server by the master server indicates the failure of the performance of the update to the database of the master server by the master server, skipping, at the replication server, the update associated with the replication message;
determining, at the replication server, a response based on the replication message received from the master server, the response identifying the request by the client and indicating both the result of the performance of the update to the database of the master server and a result of a performance of the update at the replication server; and
sending, from the replication server to the client, the response indicating the result of the performance of the update to the database of the master server by the master server and the result of the performance of the update by the replication server;
wherein the replication server, the master server, and the client are connected asynchronously, such that the client sends the request to the master server and receives the response from the replication server;
wherein the replication server determines a replication action based on the replication message received from the master server, where the replication action includes at least one of the performing of the update associated with the replication message at the replication server and the skipping of the update associated with the replication message at the replication server.

18. A system, comprising:
a processor for:
receiving a replication message from a master server, wherein the replication message received at a replication server from the master server is initiated based on a request by a client that the master server perform an update to a database of the master server, and the replication message is received by the replication server with another response from the master server including a result of the master server performing the update to the database of the master server, the result indicating a success or a failure of the performance of the update;
determining, at the replication server in response to the receipt of the replication message from the master server, the result of the performance of the update to the database of the master server by the master server, the result indicating the success or the failure of the performance of the update;
when it is determined that the result of the performance of the update to the database of the master server by the master server indicates the success of the performance of the update to the database of the master server by the master server, performing, at the replication server, an update associated with the replication message;
when it is determined that the result of the performance of the update to the database of the master server by the master server indicates the failure of the performance of the update to the database of the master server by the master server, skipping, at the replication server, the update associated with the replication message;
determining, at the replication server, a response based on the replication message received from the master server, the response identifying the request by the client and indicating both the result of the performance of the update to the database of the master server and a result of a performance of the update at the replication server; and
sending, from the replication server to the client, the response indicating the result of the performance of the update to the database of the master server by the master server and the result of the performance of the update by the replication server;

wherein the replication server, the master server, and the client are connected asynchronously, such that the client sends the request to the master server and receives the response from the replication server;

wherein the system is operable such that the replication server determines a replication action based on the replication message received from the master server, where the replication action includes at least one of the performing of the update associated with the replication message at the replication server and the skipping of the update associated with the replication message at the replication server.

19. The system of claim 18, wherein the processor is coupled to memory via a bus.

20. A computer program product embodied on a non-transitory computer readable medium, comprising:

computer code for sending a request from a client to a master server requesting that the master server perform an update to a database of the master server for initiating receipt of a replication message at a replication server from the master server, wherein the replication message from the master server is received by the replication server with another response from the master server including a result of the master server performing the update to the database of the master server, the result indicating a success or a failure of the performance of the update, such that in response to the receipt of the replication message from the master server, the replication server:

determines the result of the performance of the update to the database of the master server by the master server, the result indicating the success or the failure of the performance of the update;

when it is determined that the result of the performance of the update to the database of the master server by the master server indicates the success of the performance of the update to the database of the master server by the master server, performs an update associated with the replication message;

when it is determined that the result of the performance of the update to the database of the master server by the master server indicates the failure of the performance of the update to the database of the master server by the master server, skips the update associated with the replication message; and determines a response based on the replication message received from the master server, the response identifying the request by the client and indicating both the result of the performance of the update to the database of the master server and a result of a performance of the update at the replication server; and computer code for receiving the response at the client from the replication server, the response indicating the result of the performance of the update to the database of the master server by the master server and the result of the performance of the update by the replication server;

wherein the replication server, the master server, and the client are connected asynchronously, such that the client sends the request to the master server and receives the response from the replication server;

wherein the computer program product is operable such that the replication server determines a replication action based on the replication message received from the master server, where the replication action includes at least one of the performing of the update associated with the replication message at the replication server and the skipping of the update associated with the replication message at the replication server.

* * * * *